(12) United States Patent
Dorrell et al.

(10) Patent No.: US 8,478,715 B2
(45) Date of Patent: Jul. 2, 2013

(54) EXTENDING OLAP NAVIGATION EMPLOYING ANALYTIC WORKFLOWS

(75) Inventors: Wade C. Dorrell, Boise, ID (US); William R. Whitney, Boise, ID (US)

(73) Assignee: Microsoft Corporation, Redmond, WA (US)

(*) Notice: Subject to any disclaimer, the term of this patent is extended or adjusted under 35 U.S.C. 154(b) by 989 days.

(21) Appl. No.: 12/121,939

(22) Filed: May 16, 2008

(65) Prior Publication Data
US 2009/0287675 A1 Nov. 19, 2009

(51) Int. Cl.
*G06F 17/00* (2006.01)
*G06F 7/00* (2006.01)

(52) U.S. Cl.
USPC ........... 707/603; 607/608; 607/723; 607/748; 607/769

(58) Field of Classification Search
None
See application file for complete search history.

(56) References Cited

U.S. PATENT DOCUMENTS

| | | | |
|---|---|---|---|
| 5,809,505 A * | 9/1998 | Lo et al. ............................. | 1/1 |
| 5,987,422 A * | 11/1999 | Buzsaki ...................... | 705/7.13 |
| 6,286,129 B1 * | 9/2001 | Agarwal et al. ............... | 717/105 |
| 6,622,138 B1 | 9/2003 | Bellamkonda .................... | 707/2 |
| 6,628,312 B1 | 9/2003 | Rao ................................ | 715/853 |
| 6,904,161 B1 * | 6/2005 | Becker et al. .................. | 382/128 |
| 7,010,523 B2 | 3/2006 | Greenfield ........................ | 707/3 |
| 7,055,109 B2 * | 5/2006 | Boden et al. ................... | 715/854 |
| 7,162,701 B1 | 1/2007 | Seyffert ......................... | 715/854 |
| 7,171,427 B2 | 1/2007 | Witkowski ................. | 707/104.1 |
| 7,308,702 B1 * | 12/2007 | Thomsen et al. .................. | 726/1 |
| 7,343,386 B2 * | 3/2008 | Gomes et al. .................. | 717/100 |
| 7,447,668 B2 * | 11/2008 | Stokkan et al. .................. | 706/47 |
| 7,617,230 B2 * | 11/2009 | Srivastava .............................. | 1/1 |
| 7,640,532 B2 * | 12/2009 | Jain et al. ...................... | 717/102 |
| 8,225,283 B2 * | 7/2012 | Singh et al. .................... | 717/121 |
| 8,332,864 B2 * | 12/2012 | Bose et al. ..................... | 718/106 |
| 2002/0070953 A1 * | 6/2002 | Barg et al. ..................... | 345/700 |
| 2002/0186254 A1 * | 12/2002 | Monbaron ..................... | 345/810 |
| 2003/0050879 A1 * | 3/2003 | Rosen et al. ..................... | 705/35 |
| 2004/0034615 A1 * | 2/2004 | Thomson et al. .................. | 707/1 |
| 2004/0044636 A1 | 3/2004 | Casati ............................... | 707/1 |
| 2004/0107290 A1 * | 6/2004 | Kaplan et al. .................. | 709/231 |
| 2004/0111430 A1 * | 6/2004 | Hertling et al. ............. | 707/104.1 |
| 2004/0201604 A1 * | 10/2004 | Kraenzel et al. .............. | 345/700 |
| 2004/0260593 A1 * | 12/2004 | Abraham-Fuchs et al. ...... | 705/8 |
| 2005/0027495 A1 * | 2/2005 | Matichuk .......................... | 703/2 |

(Continued)

OTHER PUBLICATIONS

Composite Subset Measures, http://delivery.acm.org/10.1145/1170000/1164163/p403-chen.pdf?key1=1164163&key2=9632533811&coll=GUIDE&dl=GUIDE&CFID=27205242&CFTOKEN=27251992, Sep. 12-15, 2006.

(Continued)

*Primary Examiner* — Jung Kim
*Assistant Examiner* — James J Wilcox
(74) *Attorney, Agent, or Firm* — Merchant & Gould

(57) ABSTRACT

Analytic workflows for performing data analysis and other related operations are stored in an analytic workflow library and provided to a user upon selection of data from a data store. A workflow manager may rank the workflows based on a number of ranking algorithms prior to presentation. User selected workflows are executed in conjunction with relevant external applications and the analysis result provided to the user through the user's client application used to select the data. Workflows and associated interfaces may be received from a variety of sources and integrated into the workflow framework for enhancing data analysis.

20 Claims, 7 Drawing Sheets

U.S. PATENT DOCUMENTS

| | | | |
|---|---|---|---|
| 2005/0027733 A1* | 2/2005 | Donahue | 707/102 |
| 2005/0144192 A1 | 6/2005 | Chkodrov | 707/102 |
| 2006/0004749 A1* | 1/2006 | Dettinger et al. | 707/6 |
| 2006/0085445 A1 | 4/2006 | Thanu | 707/100 |
| 2006/0271583 A1 | 11/2006 | Hulen | 707/102 |
| 2006/0294048 A1* | 12/2006 | Shukla et al. | 707/1 |
| 2007/0016573 A1* | 1/2007 | Nanavati et al. | 707/5 |
| 2007/0027915 A1* | 2/2007 | Morris | 707/104.1 |
| 2007/0067373 A1* | 3/2007 | Higgins et al. | 707/206 |
| 2007/0191979 A1* | 8/2007 | Zeng et al. | 700/97 |
| 2008/0109235 A1* | 5/2008 | Binnie et al. | 705/1 |
| 2008/0109283 A1* | 5/2008 | Binnie et al. | 705/7 |
| 2008/0140666 A1* | 6/2008 | D'Alton Harrison | 707/9 |
| 2009/0070121 A1* | 3/2009 | Leonelli et al. | 705/1 |

OTHER PUBLICATIONS

Relational Extensions for OLAP http://portal.acm.org/citation.cfm?id=1014746&coll=Portal&dl=GUIDE&CFID=26993617&CFTOKEN=33805539, Jul. 2, 2007.

Towards Keyword-Driven Analytical Processing, http://delivery.acm.org/10.1145/1250000/1247549/p617-wu.pdf?key1=1247549&key2=1922533811&coll=GUIDE&dl=GUIDE&CFID=27205242&CFTOKEN=27251992, Jun. 12-14, 2007.

* cited by examiner

EXTENDING OLAP NAVIGATION EMPLOYING ANALYTIC WORKFLOWS

BACKGROUND

Data in business and similar applications is often viewed in the form of a spreadsheet. A spreadsheet may be thought of as a "two dimensional" array of data. Each cell in the spreadsheet represents a value of two related entities, or dimensions. For example, one dimension may be time, while a corresponding cross-dimension may be revenue. Many applications, however, may have data, which has more than two dimensions. Business data having more than two dimensions are called multi-dimensional data.

Multi-dimensional data may be represented in an Online Analytical Processing (OLAP) model such as Microsoft SQL Server Analysis Service® cube, for performing operations such as allocation, query, and so on in an optimal fashion. OLAP data sources typically contain a time dimension in addition to other dimensions.

OLAP client tools—applications that perform operations on data stored in an OLAP model—typically rely on a standard set of OLAP query language functions to enable analysis of the data within a OLAP data store (e.g. a data cube). The user analysis experience through such a client tool involves a multi-step approach to applying those query language functions to the data and another multi-step approach to selecting the correct visualization for understanding the data. The multi-step approach may be above the level of capability of a typical business user, and may lead to a stunted decision or require specialist capabilities.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to replacing or augmenting query language step-based approach to OLAP navigation with a data and analysis specific library and execution of analytic workflows. Workflow frameworks for enhancing data analysis through common user tolls are generated and workflows are ranked based on context-sensitive algorithms according to some embodiments. According to other embodiments, workflows are adapted to a hosting model enabling distribution of analysis techniques across defined communities.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, query language step-based approaches to OLAP navigation may be replaced or augmented with a data and analysis specific library and execution of analytic workflows, workflow frameworks may be generated for enhancing data analysis through common user tolls ranking the workflows based on context-sensitive algorithms. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process.

Figure 1:
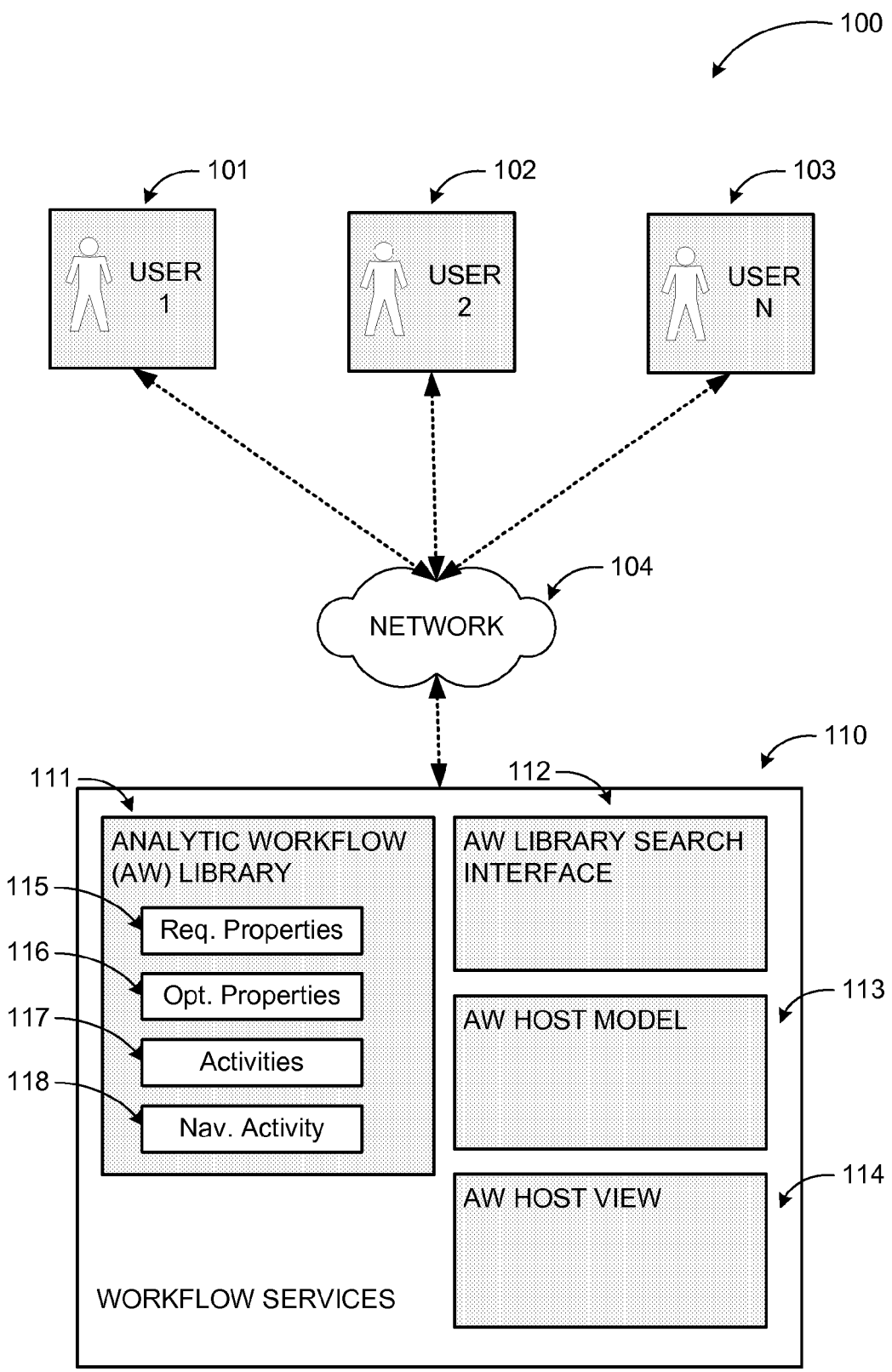
FIG. 1 is a conceptual diagram illustrating an architecture of multi-user workflow services employing analytic workflow library.

Referring to FIG. 1, conceptual diagram 100 for an architecture of multi-user workflow services employing analytic workflow library is illustrated. Such a system may be implemented as a local application with communication capabilities through a number of networks, a distributed application over a number of computing devices, or as a hosted service integrating a suite of applications with subscribers taking advantage of various features.

As discussed previously, a multi-step based approach to OLAP navigation using query languages is usually beyond the capabilities of a typical user. However, analytic workflow based approach may enable users to navigate data in two or multi-dimensional systems through a plurality of applications without having to hop or switch between applications, needing extensive knowledge of query language, or being limited to a few available options. Furthermore, analytic workflows may be designed and presented in a hosting model enabling users in a community (e.g. an enterprise or an interest based online community) to share these workflows, optimize their performance by taking advantage of ranked workflows, and other features made possible by the embodiments described herein.

An illustrative description of a conventional system and a system according to embodiments is provided in the following example. A user may need to perform a sales trend analysis for a particular product, where the data is presented through a spreadsheet application and stored in a database. In a conventional system, the user would have to (1) isolate the product; (2) select the sales measure and remove other measures; (3) remove one or more hierarchies from axes; (4) add a time hierarchy to the axis appropriate for charting; (5) select the time period typically used by the business for trending (for example, last year); (6) apply a smoothing calculation; (7) add a chart visualization; and (8) configure any other desired formatting options on the chart visualization. The user would have to be familiar with all of the operations in order to complete the sales trend analysis.

In a system according to embodiments, the user may complete the process by performing two steps: (1) select the product; and (2) select an analytic workflow to complete the analysis automatically. The system may include a plurality of analytic workflows designed by the database manager, sales department, third party vendors, or any other organization. Thus, a system according to embodiments is extensible enabling any analytic workflow to be integrated into the data navigation process.

Furthermore, a system according to embodiments, may be a hosted system allowing plurality of users—e.g. user 1 (101), user 2 (102), user N (103)—to access workflow services 110 through network 104. Workflow services 110 may include four main components for implementing analytic workflows. Analytic workflow library 111 is a virtual or physical store for available analytic workflows. Analytic workflow library 11 may include required properties 115 (a set of properties necessary to initiate the first activity in the workflow), optional properties 116 (a set of properties not necessary to start the first activity, but necessary to complete all activities in the workflow), activities 117 (these are activities with user interface metadata for obtaining the optional properties from the user), and navigation activity 118 (final activity in the workflow, which generates a new visualization for the user based on the properties).

The second component of workflow services 110 is analytic workflow library search interface 112. Search interface 112 is a non-UI component that connects to and indexes the analytic workflow library. It may have a web-service API that utilizes queries with a "typed tuple" and other context, and returns ranked results providing the identifiers (and/or metadata, like a name) of the workflows in the analytic workflow library, which are applicable.

The third component is analytic workflow host model 113. Analytic workflow host model 113 may be hosted within any client application to provide the basic analytic workflow functionality from OLAP data displayed by that application. The fourth component is analytic workflow host view 114, which is specific to the client application providing basic analytic workflow. Analytic workflow host view 114 connects with the user interface of the application. When the user selects an OLAP data point, it collects the typed tuple, and other context, and passes it to the analytic workflow host model 113. When the host model returns a ranked set of analytic workflows, it provides a user interface for the user to select one of the workflows, and then passes the selected workflow to the host model for execution.

The approaches and components of an analytic workflow based data navigation system described herein are not limited to the example ones listed above. A system according to embodiments may be implemented with additional or fewer components using the principles described herein.

While major components corresponding to core functionalities of an OLAP navigation system are shown in diagrams 100 and 200 (below) refer to applications and/or modules such as those discussed above, but they are not limited to specific applications. Any application or hosted service that performs data navigation in a networked or local computing environment may be implemented using the principles described herein.

Figure 2:
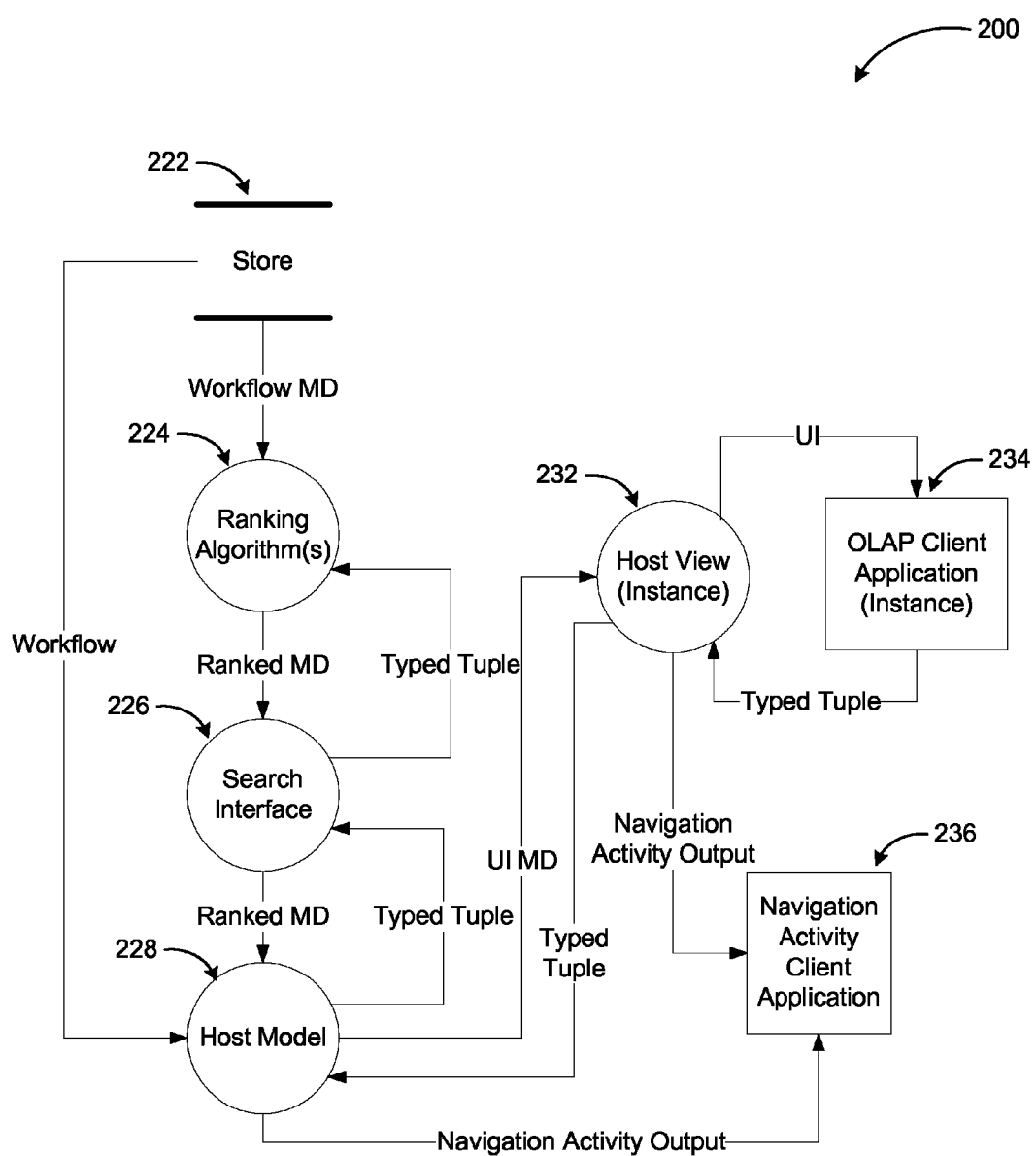
FIG. 2 illustrates major components and interactions between the major components of an example OLAP navigation system according to embodiments.

FIG. 2 illustrates major components and interactions between the major components of an example OLAP navigation system in diagram 200 according to embodiments.

As briefly discussed above, a system according to embodiments may take advantage of availability of a plurality of analytic workflows and participation of multiple users and rank workflows to provide the users a further benefit. Analytic workflow library containing available workflows may reside in store 222. The workflows may be serialized for storage and distribution. The navigation activity may also be serialized as part of the process, and may either contain an embedded copy of the native serialization of the visualization and queries required for the visualization, or a link to that content such that the visualization and queries need not be duplicated for each serialized workflow.

Several algorithms (224) can be used to rank results, through an extensible architecture. Ranking algorithms 224 receive workflow metadata from the store 222 and typed tuple from search interface 226, perform ranking operations, and provide ranked metadata to the search interface 226. The ranking may be performed according to any definition provided by the designers or users. For example, workflows may be ranked higher based on a number of matched properties. Those missing more properties may be ranked lower. This approach would make the most applicable analysis techniques the most commonly used. Another example ranking algorithm may prioritize the least recently used workflows to guarantee an equal distribution of analysis techniques with the same typed tuple across the available set of workflows. A further ranking method may involve use of user votes. To enable sharing of best liked visualizations, for example, an external voting mechanism among participating users may be implemented and the highest voted workflows may be ranked the highest.

The ranking may not be limited to a single algorithm. Workflows may be assigned weighting factors based on results of multiple algorithms and prioritized based on their total weighting factors as well.

Host model 228 receives workflow ranking from search interface 226 and based on the ranked response and user selection, hosts and executes the workflow. As discussed above, host view 232 connects with the user interface of the client application 234. When the user selects a data point, host view 232 collects the typed tuple and passes it to the host model 228. When the host model 228 returns a ranked set of analytic workflows, it provides a user interface for the user to select one of the workflows, and then passes the selected workflow to the host model 232 for execution.

According to some embodiments, host view 232 may also be involved in executing the navigation activity in client application (236) by providing navigation activity output to the client application along with the host model 228.

Figure 3:
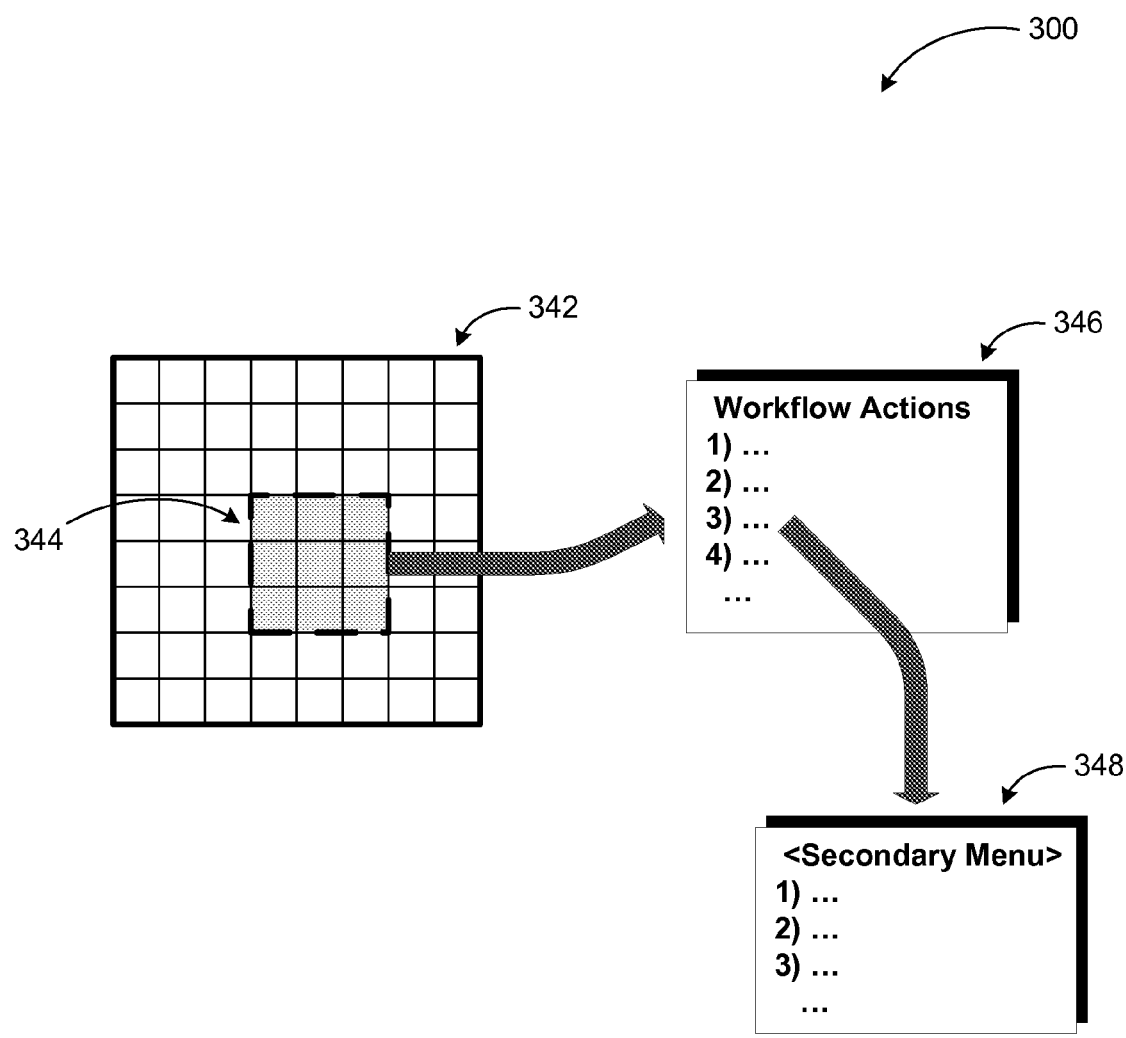
FIG. 3 illustrates an example spreadsheet and user interfaces for interacting with a user to enable the user take advantage of analytic workflow activities.

FIG. 3 illustrates an example spreadsheet and user interfaces for interacting with a user to enable the user take advantage of analytic workflow activities in diagram 300. As discussed previously, data may be presented in form of a spreadsheet 342 by the client application. Upon selection of a data point (or group of data points) 344 by the user, a menu 346 listing available workflow actions may be provided according to their rankings. The display of the ranked workflow list may be through a pop-up menu, a separate display window, a hover-on style menu, and the like. If the workflow involved (requires) additional user input or selection, a secondary menu 348 may be provided upon selection of an analytic workflow by the user from the ranked list in menu 346.

Once the user selection is completed, the system may complete its computations and provide the results through another user interface. The user interfaces described herein are for illustration purposes only and any user interface known in the art may be implemented for interaction with the user to present and select a workflow, and to provide computation results. The user interfaces may be designed as part of the workflow modules or as part of the client application.

Figure 4:
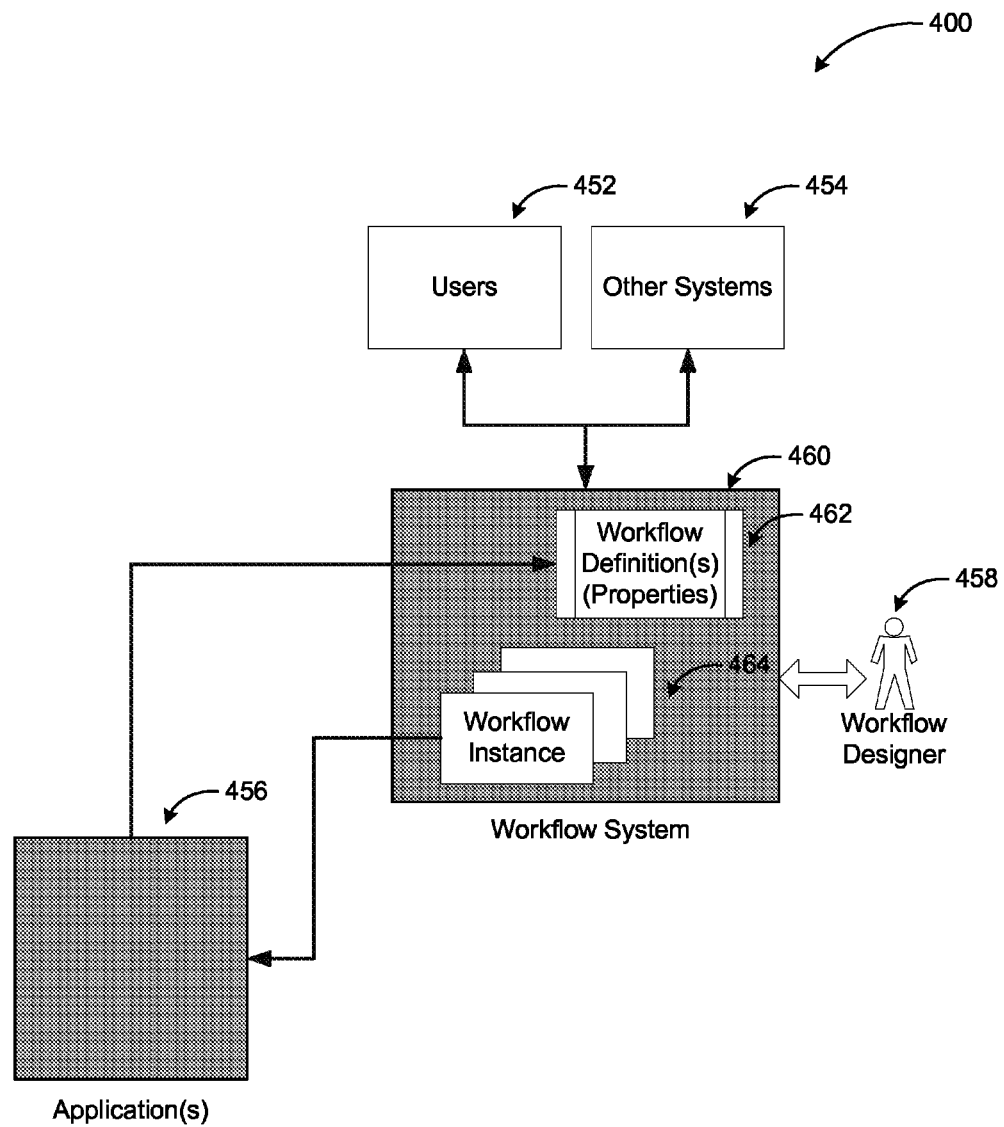
FIG. 4 is a diagram illustrating a workflow system according to embodiments interacting with users and applications.

FIG. 4 includes diagram 400 illustrating a workflow system according to embodiments interacting with users and applications. Workflow system 460 may be implemented as an add-on module for client application(s) 456 or as a separate application interacting with a variety of applications. Workflow designer(s) 458 such as third party vendors, information technology departments, individual departments of an enterprise, or even individual users, may provide workflow definitions (and properties) to the system. Available workflows may be ranked as described above based on data selection by a user (452) and/or input from other systems 454 (e.g. in a hosted environment). Once a user makes their selection among the ranked workflows, an instance of the workflow 464 may be executed in conjunction with the user's client application 456 providing the results of data navigation to the user.

As discussed previously, the user's request may involve multiple serialized workflows and multiple applications for computation of portions of the analysis. The workflow(s) may be designed to perform these operations automatically and provide the end result (visualization) to the user through the client application.

Embodiments are not limited to the example components, user interfaces, functionalities, and interaction architecture provided in these figures. A data navigation system employing analytic workflows may be implemented with a number of additional components and functionalities depending on the needs of users. Furthermore, a hosted service providing data navigation through analytic workflows may implement these components in a scalable and customizable architecture that includes third party modules.

Figure 5:
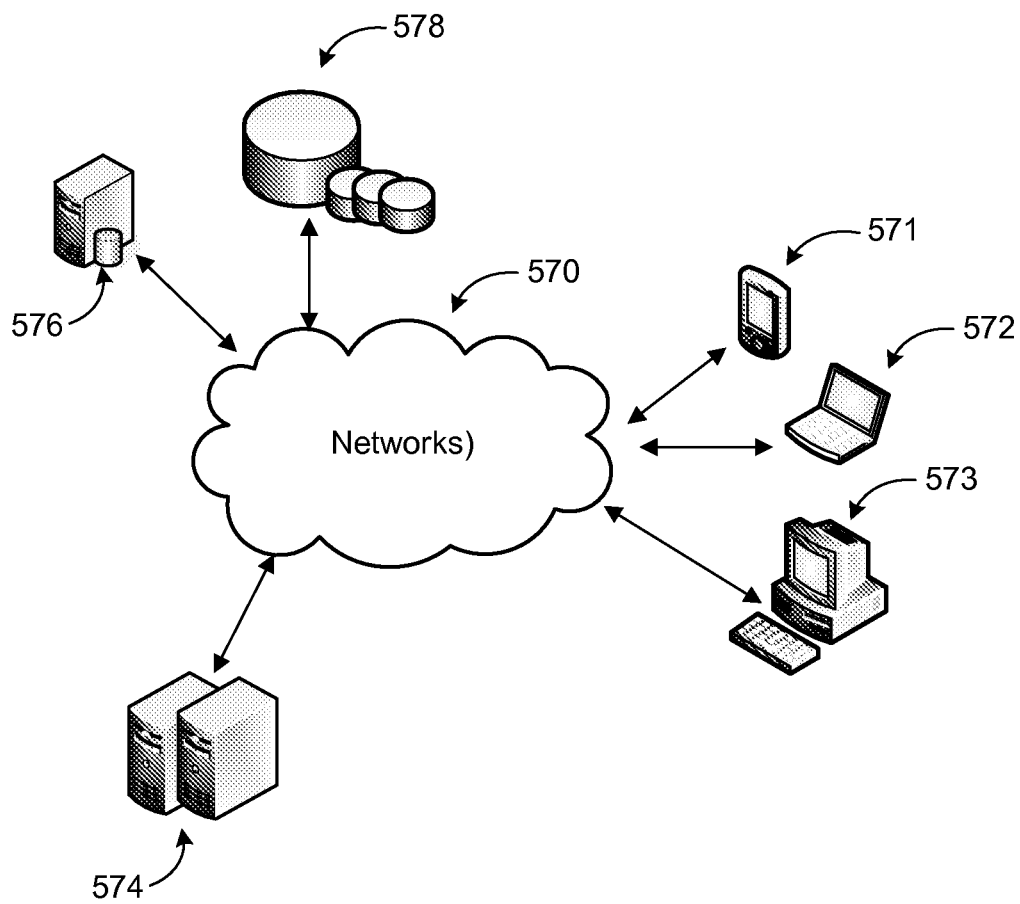
FIG. 5 is a networked environment where embodiments may be implemented.

FIG. 5 is an example networked environment, where embodiments may be implemented. A workflow based data navigation system may be implemented employing local or distributed applications running on one or more computing devices configured in a distributed manner over a number of physical and virtual clients and servers. It may also be implemented in un-clustered systems or clustered systems employing a number of nodes communicating over one or more networks (e.g. network(s) 570).

Such a system may comprise any topology of servers, clients, Internet service providers, and communication media. Also, the system may have a static or dynamic topology, where the roles of servers and clients within the system's hierarchy and their interrelations may be defined statically by an administrator or dynamically based on availability of devices, load balancing, and the like. The term "client" may refer to a client application or a client device. While a networked system implementing data navigation through analytic workflows may involve many more components, relevant ones are discussed in conjunction with this figure.

As mentioned above, a hosted service or an application providing analytic workflow based data navigation services may be executed by server 574 and accessed for providing data, receiving analysis reports, and for other interactions by users (e.g. businesses and their customers) through client devices 571-573 or other servers (not shown). Server 574 may interact with data stores for storing the data to be navigated such as data stores 578. Data stores 578 may be virtual or physical and in one example include an OLAP store. Data stores 578 may be managed by database server 576. Additional servers (and/or clients) may be involved in providing data navigation through analytic workflows and communicate with server 574 through network(s) 570. Network(s) 570 may be a public network such as the Internet or private networks.

Network(s) 570 may include a secure network such as an enterprise network, an unsecure network such as a wireless open network, or the Internet. Network(s) 570 provide communication between the nodes described herein. By way of example, and not limitation, network(s) 570 may include wired media such as a wired network or direct-wired connection, and wireless media such as acoustic, RF, infrared and other wireless media.

Many other configurations of computing devices, applications, data sources, data distribution systems may be employed to implement a data navigation system employing analytic workflows. Furthermore, the networked environments discussed in FIG. 5 are for illustration purposes only. Embodiments are not limited to the example applications, modules, or processes.

Figure 6:
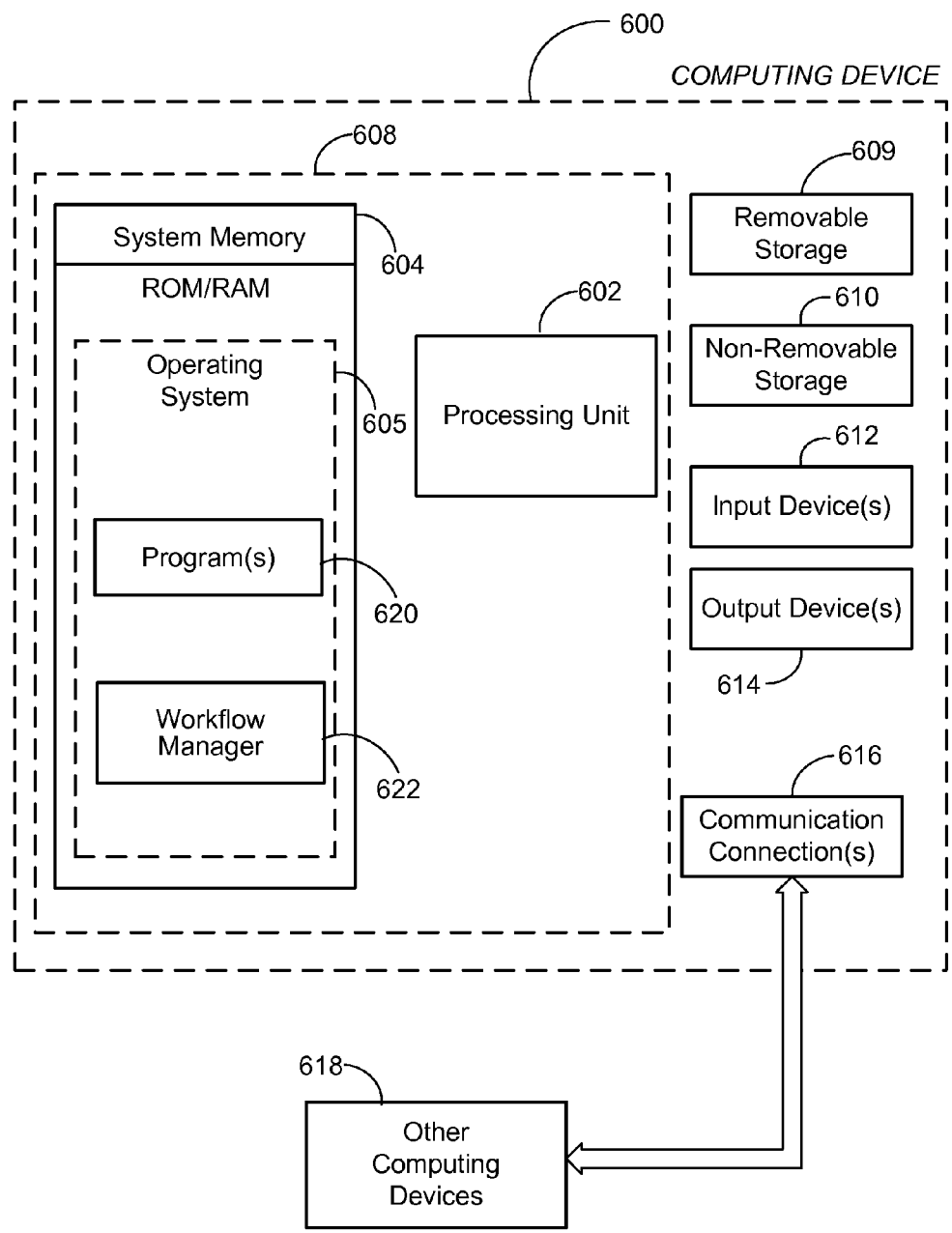
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment is illustrated, such as computing device 600. In a basic configuration, the computing device 600 may be a client device or a server executing analytic and OLAP navigation applications. Computing device 600 may typically include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of a networked personal computer, such as the WINDOWS® operating systems from MICROSOFT CORPORATION of Redmond, Wash. The system memory 604 may also include one or more software applications such as program(s) 620 and workflow manager 622.

Workflow manager 622 may be an application, add-on module, or hosted service providing analytic workflows to user for navigating data. Workflow manager 622 may coordinate storage of available workflows in analytic workflow library, interaction with user for selection of applicable workflow(s) such as through a ranked workflow list, and coordinate execution of the workflows in conjunction with any relevant applications (in addition to the client application enabling the user to select data and receive computation results). This basic configuration is illustrated in FIG. 6 by those components within dashed line 608. The functionality of workflow manager 622 does not have to be assigned to the distinct modules as described here. The above disclosed functionality may be performed by more or fewer modules or all by the same application (or service).

The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of device 600. Computing device 600 may also have input device(s) 612 such as keyboard, mouse, pen, voice input device, touch input device, etc. Output device(s) 614 such as a display, speakers, printer, etc. may also be included. These devices are well known in the art and need not be discussed at length here.

The computing device 600 may also contain communication connections 616 that allow the device to communicate with other computing devices 618, such as over a wireless network in a distributed computing environment, for example, an intranet or the Internet. Other computing devices 618 may include web servers, database servers, file servers, provider servers, and the like. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The claimed subject matter also includes methods of operation. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
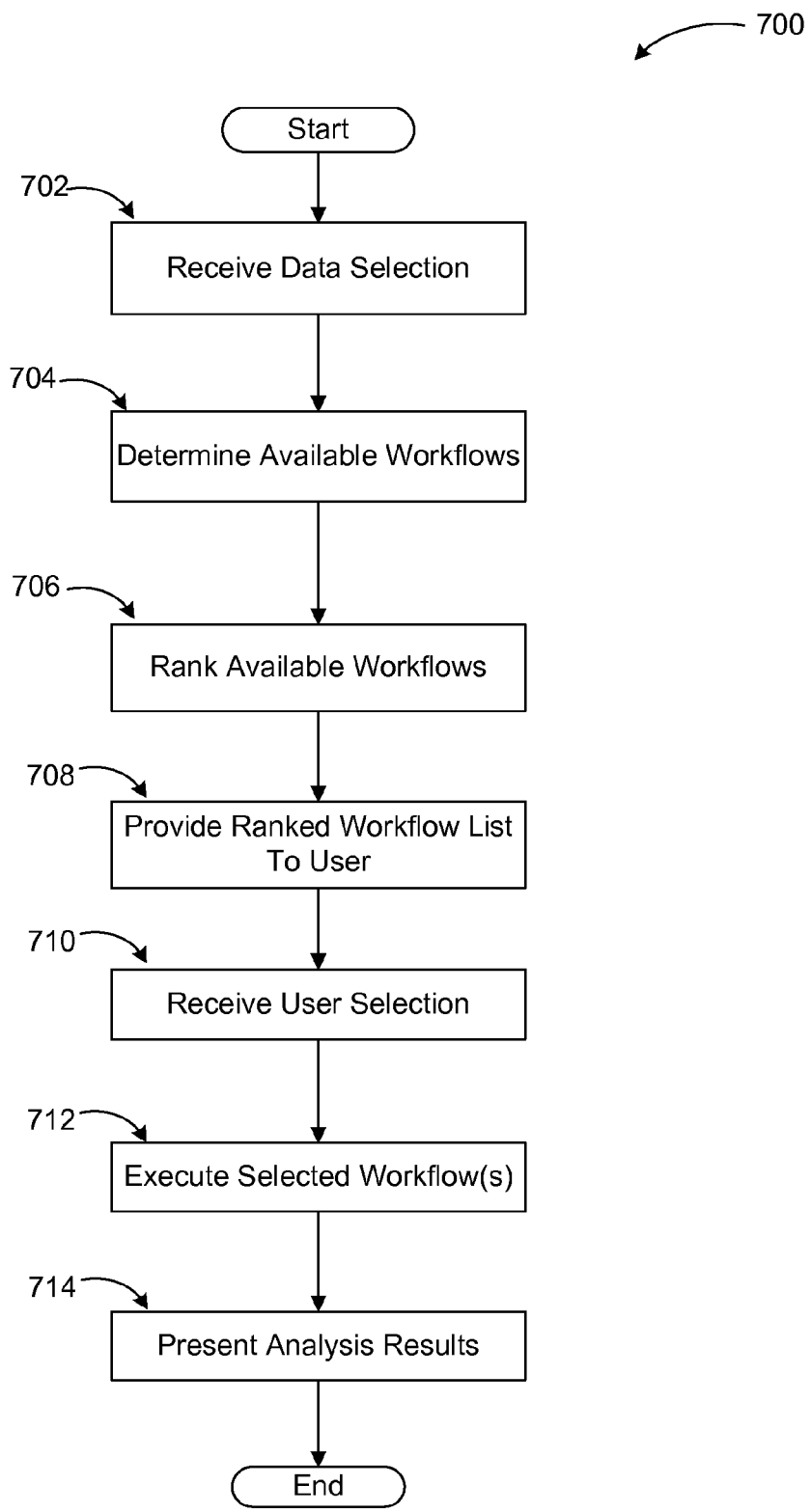
FIG. 7 illustrates a logic flow diagram of an example process for extending OLAP navigation using analytic workflows according to embodiments.

FIG. 7 illustrates a logic flow diagram of an example process 700 for extending OLAP navigation using analytic workflows according to embodiments. Process 700 may be implemented in any networked or local computing environment.

Process 700 begins with operation 702, where selection of a particular data point or group of data points is received from a user through a client application interface. Available workflows are determined based on the selected data points and their context at following operation 704. Subsequently, the workflows are ranked by one or more ranking algorithms at operation 706.

The ranked workflows are presented to the user for selection of an applicable workflow or multiple workflows from the ranked list at operation 708. The applicable workflow may also be selected automatically according to a predefined user preference or application configuration. If the workflow is to be selected by the user, that selection is received in operation 710 and the selected workflow(s) is (are) executed by the system analyzing the user selected data. The analysis results are then provided to the user according to user defined or application default presentation parameters.

The operations included in process 700 are for illustration purposes. Extending OLAP navigation employing analytic workflows may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for data navigation employing analytic workflows, the method comprising:

providing an analytic workflow library having predefined workflows and properties associated therewith;

hosting an analytic workflow host model within a client application to provide workflow functionality from data displayed by the client application;

providing a workflow host view to connect with a user interface of the client application to receive a selection of a data point from the data displayed by the client application;

automatically collecting by the workflow host view a typed tuple and context information based on the selection of the data point;

passing the collected typed tuple and context information to the analytic workflow host model;

ranking, by the analytic workflow host model, a set of analytic workflows obtained from the analytic workflow library based on the collected typed tuple and context information for the selected data point;

providing, by the analytic workflow host model, the user interface for display by the client application presenting the ranked set of analytic workflows for selection of one of the analytic workflows from the ranked set of analytic workflows applicable to the selected data point to a user;

receiving for execution, at the analytic workflow host model, an analytic workflow selected from the ranked set of analytic workflows;

executing, by the analytic workflow host model, the selected analytic workflow on the selected data point; and providing visualization of the selected data point for presentation by the client application based on properties associated with the selected analytic workflow executed by the analytic workflow host model.

2. The method of claim 1, further comprising:

ranking the available analytic workflows applicable to the selected data point employing at least one ranking algorithm.

3. The method of claim 2, wherein the ranked analytic workflows are ranked based on a total weight factor derived from executing a plurality of ranking algorithms and assigning a weight factor to a result of each ranking algorithm.

4. The method of claim 3, wherein the ranking algorithms include at least one from a set of: ranking based on a number of matched properties, ranking based on least-recently-used, and ranking based on user community voting.

5. The method of claim 1, further comprising serializing the workflows in the analytic workflow library for storage and distribution.

6. The method of claim 5, wherein data navigation activities are serialized and include one of: an embedded copy of native serialization of visualization and queries required for the visualization and a link to native serialization content such that the visualization and the required queries are not duplicated for each serialized analytic workflow.

7. The method of claim 1, wherein the executing, by the analytic workflow host model, the selected analytic workflow includes launching of at least one application external to the client application.

8. The method of claim 1, further comprising:

upon receiving, at the analytic workflow host model, selection of the analytic workflow, providing a tertiary user interface for receiving at least one operational parameter associated with the selected analytic workflow from the user.

9. The method of claim 1, wherein the visualization of the selected data point based on properties associated with the selected analytic workflow is presented to the user as one of: a chart, a diagram, a data listing, and a comprehensive report.

10. A system for data navigation employing analytic workflows, the system comprising:

a processor;

a data store for storing data to be navigated;

an analytic workflow library for storing analytic workflows provided and properties associated therewith from a plurality of sources; and at least one server configured to facilitate a hosted service for data navigation, wherein the hosted service includes:

a search interface configured to connect to and index the analytic workflow library;

an analytic workflow host model to be hosted within a client application employed by a user, wherein the analytic workflow host model provides analytic workflow functionality from data displayed by the client application;

a workflow host view specific to the client application, configured to:

connect with a user interface of the client application;

in response to receiving a user selection of a data point from the data displayed by the client application, automatically collect a typed tuple and context information based on selection of the data point;

pass the typed tuple and context information to the analytic workflow host model for determining available analytic workflows applicable to the selected data point to provide automated multi-step navigation of the selected data point;

wherein the analytic workflow host model ranking a set of analytic workflows obtained from the analytic workflow library based on the collected typed tuple and context information for the selected data point and providing the user interface for display by the client application presenting the ranked set of analytic workflows for selection of one of the analytic workflows from the ranked set of analytic workflows applicable to the selected data point to the user;

the analytic workflow host model receiving for execution the user selection from the ranked set of analytic workflows;

executing the selected analytic workflow on the selected data point; and wherein visualization of the selected data point is provided for presentation by the client application based on properties associated with the selected analytic workflow executed by the analytic workflow host model; and a ranking module for prioritizing the analytic workflows applicable to the user selected data point based on executing at least one ranking algorithm.

11. The system of claim 10, wherein the host view is further configured to:

filter the ranked set of analytic workflows based on a predefined criterion prior to providing them to the user.

12. The system of claim 10, wherein the analytic workflow library is one of a virtual data store and a physical data store.

13. The system of claim 10, wherein the analytic workflow library includes at least one from a set of:

"required" properties necessary to initiate a first activity in the selected workflow;

"optional" properties necessary to complete all activities in the selected workflow, but not necessary to start the first activity;

activities associated with user interface metadata for obtaining the optional properties from the user; and navigation activity that is a final activity in the selected workflow generating a new visualization for the user based on the "required" properties.

14. The system of claim 13, wherein the "required" properties are exposed such that the analytic workflow library is readily searchable.

15. A data store running on a computer, the data store including computer readable instructions, that when executed by a processor perform the method for data navigation employing analytic workflows, the method comprising:

providing an analytic workflow library having predefined workflows and properties associated therewith;

hosting an analytic workflow host model within a client application to provide workflow functionality from data displayed by the client application;

providing a workflow host view to connect with a user interface of the client application to receive a selection of a data point from the data displayed by the client application;

automatically collecting by the workflow host view a typed tuple and context information based on the selection of the data point;

passing the collected typed tuple and context information to the analytic workflow host model;

ranking, by the analytic workflow host model, a set of analytic workflows obtained from the analytic workflow library based on the collected typed tuple and context information for the selected data point;

providing, by the analytic workflow host model, the user interface for display by the client application presenting the ranked set of analytic workflows for selection of one of the analytic workflows from the ranked set of analytic workflows applicable to the selected data point to a user;

receiving for execution, at the analytic workflow host model, an analytic workflow selected from the ranked set of analytic workflows;

executing, by the analytic workflow host model, the selected analytic workflow on the selected data point; and providing visualization of the selected data point for presentation by the client application based on properties associated with the selected analytic workflow executed by the analytic workflow host model.

16. The data store of claim 15, further comprising:
ranking the available analytic workflows applicable to the selected data point employing at least one ranking algorithm.

17. The data store of claim 16, wherein the ranked analytic workflows are ranked based on a total weight factor derived from executing a plurality of ranking algorithms and assigning a weight factor to a result of each ranking algorithm.

18. The data store of claim 17, wherein the ranking algorithms include at least one from a set of: ranking based on a number of matched properties, ranking based on least-recently-used, and ranking based on user community voting.

19. The data store of claim 15, further comprising serializing the workflows in the analytic workflow library for storage and distribution.

20. The data store of claim 15, wherein the selected analytic workflow includes launching of at least one application external to the client application.

* * * * *

UNITED STATES PATENT AND TRADEMARK OFFICE
CERTIFICATE OF CORRECTION

PATENT NO. : 8,478,715 B2  
APPLICATION NO. : 12/121939  
DATED : July 2, 2013  
INVENTOR(S) : Dorrell et al.

Page 1 of 1

It is certified that error appears in the above-identified patent and that said Letters Patent is hereby corrected as shown below:

In the Specification

Column 7, lines 19-20, delete "nonvolatile," and insert -- non-volatile, --, therefor.

Signed and Sealed this
Tenth Day of February, 2015

Michelle K. Lee
*Deputy Director of the United States Patent and Trademark Office*